United States Patent

Gee et al.

[11] 3,900,077
[45] Aug. 19, 1975

[54] VEHICLE FOR SURF ZONE WORK

[75] Inventors: James E. Gee, Washington; Harlan H. Fels, Chillicothe, both of Ill.

[73] Assignee: Caterpillar Tractor Company, Peoria, Ill.

[22] Filed: Apr. 3, 1974

[21] Appl. No.: 457,493

[52] U.S. Cl. .............. 180/9.46; 37/54; 61/46.5; 61/69 R; 114/16 R
[51] Int. Cl.[2] .............................. B62D 11/20
[58] Field of Search ............ 180/6.48, 6.5, 6.7, 9, 180/46; 114/16 R; 115/1 R; 61/69 R, 46.5; 37/54, 56

[56] References Cited
UNITED STATES PATENTS

| | | | |
|---|---|---|---|
| 1,804,816 | 5/1931 | Shelton | 180/9.46 |
| 3,755,932 | 9/1973 | Cargile | 61/46.5 X |
| 3,792,745 | 2/1974 | Files | 180/9.46 |

*Primary Examiner*—David Schonberg
*Assistant Examiner*—John A. Pekar
*Attorney, Agent, or Firm*—Ralph E. Walters

[57] ABSTRACT

A vehicle for surf zone work including a generally horizontal platform which is adapted to be above water level. The vehicle includes a plurality of at least three downwardly extending legs and a plurality of traction units, one for each leg, for engaging underlying, submerged terrain and moving the vehicle thereon.

Each traction unit is connected to its associated leg by a device providing limited but substantially universal movement so that the traction may adjust itself to abrupt terrain changes as it individually encounters them. Each leg is provided with a telescoping structure whereby the vertical location of the associated traction unit with respect to the platform may be selectively altered to maintain the platform substantially horizontal. Further, each traction unit is provided with an individual steering device.

6 Claims, 6 Drawing Figures

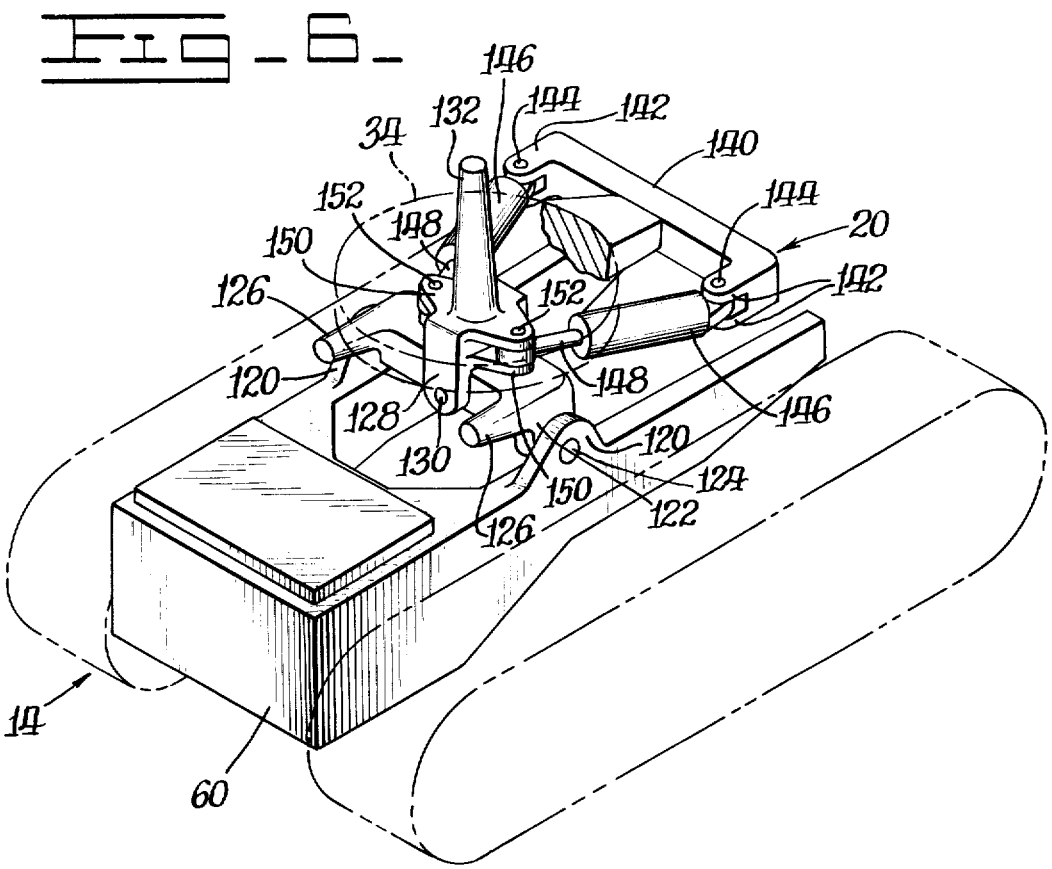

VEHICLE FOR SURF ZONE WORK

BACKGROUND OF THE INVENTION

This invention relates to vehicles for performing work in so-called "surf zones" such as dredging operations or the like.

Pertinent prior art includes U.S. Pat. Nos. 3,229,391; 3,480,326; 3,568,454; 3,680,521; 3,683,521; and 3,757,438. Also of relevance is British Patent 1,212,172.

Land-based material shortages have been instrumental in promoting recent interest in efforts in developing earth moving equipment capable of operating in offshore areas such as the Continental Shelf. Other marine applications, such as providing improved dredging equipment, have also stimulated such interest and efforts.

Heretofore, there have been a variety of proposals for work-type vehicles which may operate in a partially submerged condition. Typical of such structures are those shown in U.S. Pat. Nos. 3,680,521 and 3,757,438. However, the degree of submersionability of such vehicles is extremely limited, with the result that offshore areas on the Continental Shelf are nonetheless too deep for such vehicles to operate.

Attempts have been made to overcome the difficulty provided by such vehicles in providing totally submersible earth-working vehicles which are regulated by remote control stations above water level such as on suspended or floating platforms. U.S. Pat. Nos. 3,480,326; 3,568,454; and 3,683,521 and British Pat. No. 1,212,172 illustrate prior efforts of this particular type. Such earth-working vehicles also have not met with universal approval in that difficulty has been encountered in maintaining effective control of remotely disposed traction units.

SUMMARY OF THE INVENTION

It is the principal object of the invention to provide a new and improved vehicle for performing work in the so-called "surf zone." More specifically, it is an object of the invention to provide such a vehicle wherein the same may perform work on offshore terrain at substantial depths and yet which is not subject to difficulties in control of remotely disposed traction units.

An exemplary embodiment of the invention achieves the foregoing objects in a structure including a generally horizontal platform which is adapted to be located above water level and support work equipment to be operated therefrom to encounter the underlying, submerged terrain. The platform includes a plurality of at least three depending legs, each of which is provided with a traction unit for engaging and travelling upon the underlying submerged terrain.

Each traction unit is universally secured to the lower end of its associated leg so that the same may easily shift when abrupt changes in the underlying terrain over which the traction unit is individually travelling are encountered.

Moreover, individually operable steering mechanisms are provided for each traction unit and each leg is provided with telescoping structure whereby the effective length of the same may be changed as desired to maintain the platform in a generally horizontal position.

According to one embodiment of the invention, a traction unit comprises a central frame flanked by a pair of crawler-type tracks which are driven by a motor system within the frame. The frame, in turn, is pivotally universally connected to the associated leg by means of a ball joint and may be steered by a motor having a reciprocal output such as a hydraulic cylinder through a linkage.

One preferred form of a linkage includes a link pivotally secured to the reciprocal output member of the motor and to the associated leg combined with a second link universally connected to the central frame and to the reciprocal output member.

In another form of the invention, the universal connection of each traction unit to its associated leg is provided by a pair of yokes. A first of the yokes is connected to the central section of the associated traction unit to allow relative rotation between the two about a generally horizontal axis. A second yoke is pivotally connected to the first yoke to allow relative rotation about a second generally horizontal axis, which second axis is generally transverse to the first horizontal axis. The second yoke is also pivotally connected to the associated leg for rotation about a generally vertical axis to provide for steering.

In this form of the invention, steering is provided by a motor, again, preferably of the type having a reciprocal output shaft such as a hydraulic cylinder, which is pivotally connected to the leg and to the second yoke member.

In a highly preferred embodiment, the position of each of the traction units relative to the associated leg is monitored through a synchrosystem and may be controlled by a servomechanism.

Also, in a highly preferred embodiment, motors are provided for individually and selectively adjusting the effective length of each leg.

Other objects and advantages will become apparent from the following specification taken in connection with the accompanying drawings.

DESCRIPTION OF THE DRAWINGS

FIG. 6 is a perspective view of a second embodiment of a traction unit made according to the invention with parts broken away for clarity.

DESCRIPTION OF THE PREFERRED EMBODIMENTS

Figure 1:
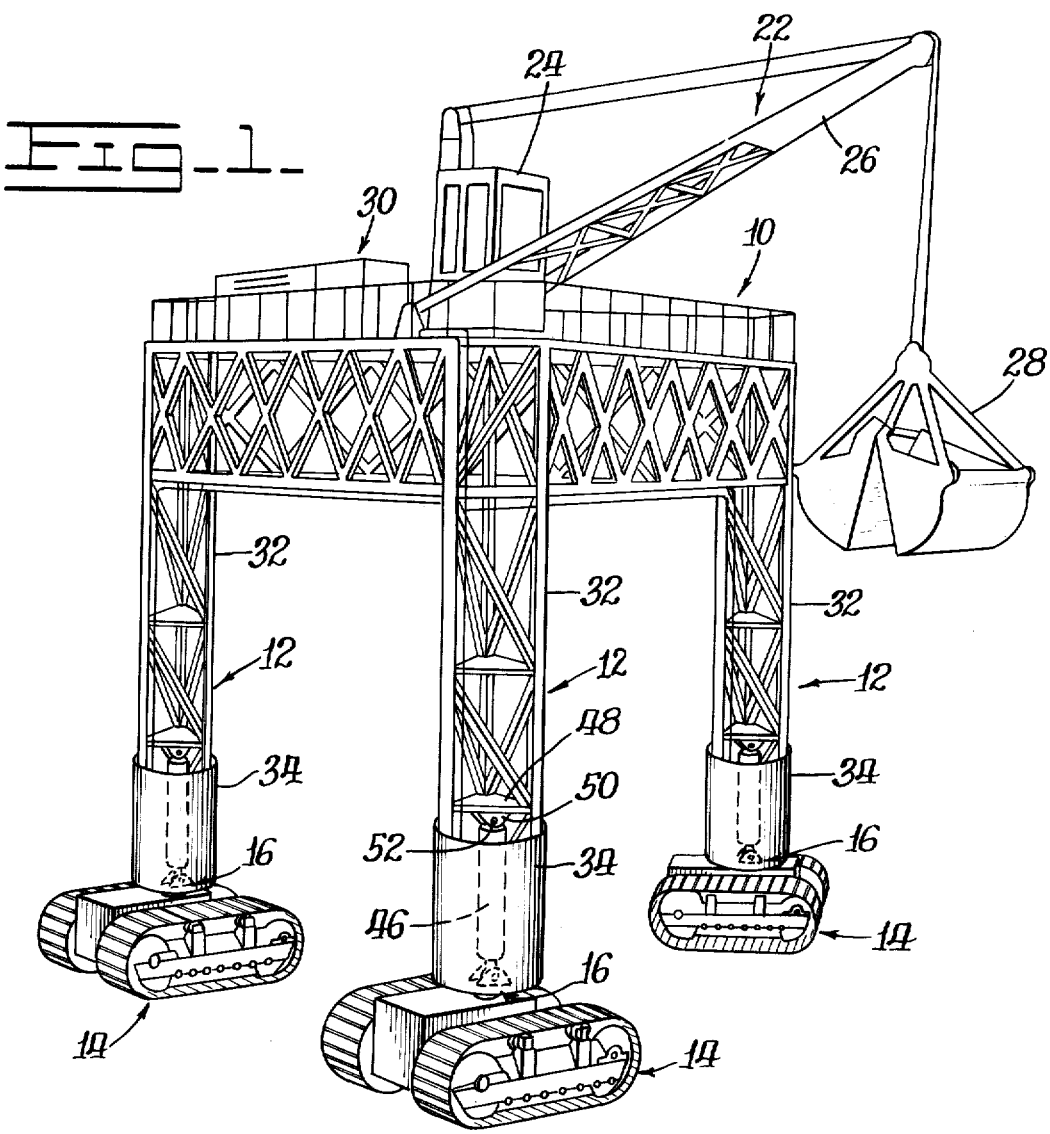
FIG. 1 is a perspective view of a vehicle made according to the invention.
Figure 2:
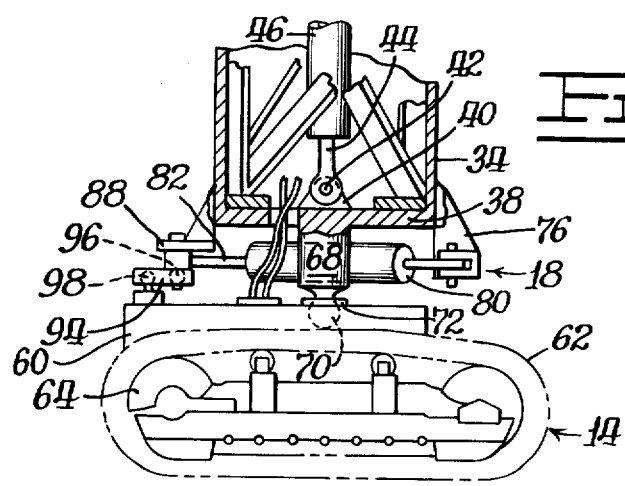
FIG. 2 is a side elevation of an individual traction unit employed in the invention with parts shown in section for clarity.

One embodiment of a vehicle for surf zone work made according to the invention is illustrated in FIG. 1 and is seen to include a platform, generally designated 10, including a plurality of at least three, spaced, depending legs, generally designated 12, and each having a traction unit, generally designated 14, associated with the lower end thereof. Each traction unit 14 is connected to its associated leg 12 by a connection, generally designated 16, which allows limited, substantially universal movement of the traction unit 14 on the leg. The general organization is completed by a steering mechanism, generally designated 18, as seen in FIG. 2, or as generally designated 20, as seen in FIG. 6.

The platform 10 may take on any desired form, which form will be dependent upon the nature of the work to be performed by the vehicle. In the embodiment illustrated in FIG. 1, the platform 10 is triangular with the legs 12 located at each apex thereof. The platform mounts work performing means, generally designated 22, which may be operated from a cab 24 housing controls (not shown). As illustrated, the work performing means 22 include a boom 26 for controlling a clam shell bucket 28, although it is to be understood no restriction to any particular form of work performing means is intended. Lastly, the platform 10 may mount a power unit, generally designated 30, which may provide power for the work performing means 22 as well as the traction units 14.

Figure 3:
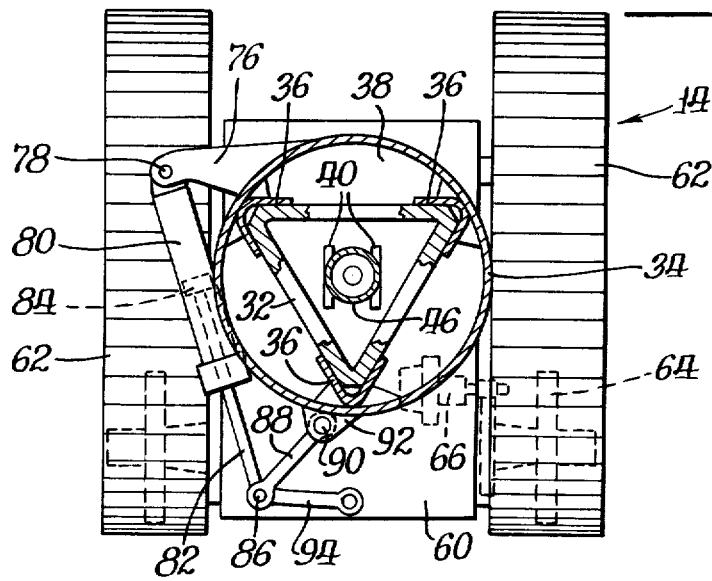
FIG. 3 is a plan view of an individual traction unit employed in the invention, again with parts shown in section for clarity.

Turning now to the legs 12, as best seen in FIGS. 1 and 3, each includes a first leg element 32 which is triangular in cross section and which may be formed of a plurality of structural members interconnected according to good engineering practice. Each leg 12 further includes a second leg element 34 which is generally cylindrical in cross section and which carries internally, slide bearings 36, as illustrated in FIG. 3, which slidably receive the apices of the triangular cross section of the first leg element 32. The second leg element also carries a circular bottom panel or plate 38.

From the foregoing, it will be appreciated that each leg 12 is a telescoping structure, the second leg element 34 being slidable upon the first leg element 32 whereby the effective length of each leg 12 may be changed to allow the vehicle platform 10 to remain in a substantially horizontal position even though the individual legs 12 are disposed in differing depths.

To readily accomplish such an adjustment, motor means are provided whereby the relative position of the first and second leg elements 32 and 34 may be selectively varied. With reference to FIG. 3, upstanding from the bottom plate 38 is a pair of apertured tongues 40. As seen in FIGS. 1 and 2, a pivot pin 42 extends through the apertures in the tongues 40 to pivotally mount the rod 44 of a hydraulic cylinder 46.

A cross plate 48 (FIG. 1) in each leg element 32 mounts a similar pair of depending tongues 50 by which a pivot pin 52 mounts the opposite end of the cylinder 46. Thus, by appropriate energization of the cylinder 46, the leg element 34 may be extended or retracted on the leg element 32 to adjust the effective length of the leg 12.

Referring again to FIGS. 1 and 3, a typical traction unit 14 will be described. Basically, each includes a central frame 60 flanked by two crawler-type tracks 62. The usual components for such tracks are provided in terms of a drive sprocket 64, an idler sprocket (not shown) and roller assemblies shown, but not numbered, in FIG. 1. Also provided within the central frame 60, and preferably within a sealed housing therein, is a pair of hydraulic motors 66 (only one of which is shown) for driving an associated one of the tracks 62.

Turning now to FIG. 2, according to one embodiment of the invention, the traction unit 14 is secured to the bottom plate 38 of a corresponding leg element 34 by means of a downwardly extending projection 68 which terminates in a ball 70 which, by means 72, is secured in an appropriate recess within the frame 60. In other words, the elements 70 and 72 define a heavy duty ball joint connection between each leg 12 and an associated traction unit 14 so that the latter is universally pivotally connected to the underside of the corresponding leg 12. Preferably, the ball joint connection is located relatively centrally of the traction unit 14 from the weight standpoint so that the weight of the traction unit is relatively uniformly distributed about the universal connection.

As a result of the foregoing construction, it will be appreciated that each traction unit 14 can cant at compound angles relative to its associated leg as the vehicle is travelling and the individual unit 14 encounters abrupt changes in the terrain over which it individually may be travelling.

One form of a steering mechanism is illustrated in FIGS. 2 and 3 by which each traction unit 14 may be pivoted about a substantially vertical axis for steering purposes, the axis being coincident with the previously described ball joint. Referring to FIG. 3, an outwardly and downwardly extending bracket 76, by means of a pivot pin 78, pivotally mounts one end of a hydraulic cylinder 80. The cylinder 80 includes a reciprocal output in the form of a piston rod 82 connected to an internal piston 84 in the usual fashion. The exterior end of the rod 82 is pivotally connected by a pin 86 to a link 88 which, in turn, is connected by a pin 90 to ears 92 on the leg element 34. In addition, a link 94 interconnects the rod 82 to the central frame 60 of the traction unit 14.

With reference to FIG. 2, the link 94 has one end connected as by a ball joint 96 to the end of the piston rod 82. The other end of the link 94 is connected by a ball joint 98 to the traction unit 14. The rod 82 and links 88 and 94 form a scissor or toggle type steering linkage which preferably is dimensioned so that 90° of turning action may be accommodated. In this connection, it will be appreciated that the use of the ball joints 96 and 98 in connection with the link 94, provide a positive steering connection regardless of the degree of canting of a traction unit 14 relative to its associated leg.

Figure 4:
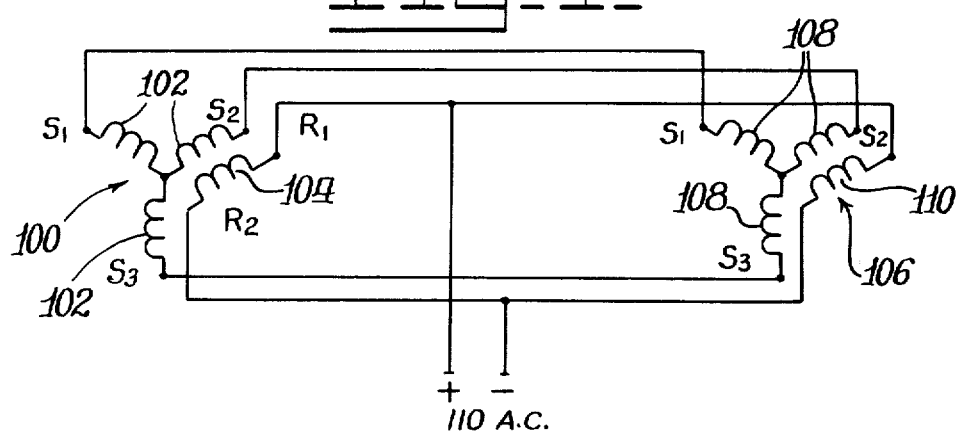
FIG. 4 is a simplified schematic of a synchrosystem.
Figure 5:
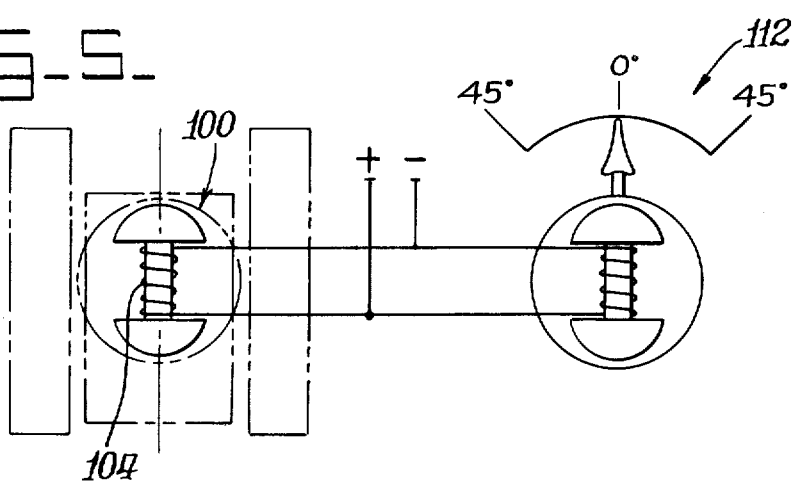
FIG. 5 is a somewhat schematic illustration of the relationship of the synchrosystem to the traction unit and to an indicator.

Preferably, an automatic control system for controlling the flow of fluid to the cylinder 80 with a manual override is provided. A typical system is shown somewhat schematically in FIGS. 4 and 5 as representative of an automatic positioning system. Specifically, a synchrogenerator, generally designated 100, is provided and includes a three-phase connection of impedances 102 along with a rotative impedance 104. Also provided is a synchromotor, generally designated 106, which has a similar three-phase connection of impedances 108 as well as a rotative impedance 110. The various impedances are connected generally as shown and, as will be apparent to one skilled in the art, will provide position responsive indication of the position of a traction unit 14 relative to its associated leg. Such an electrical indication, in addition to being converted to a mechanical indication through a gauge, generally designated 112, associated with the armature of the synchromotor 106, can be employed in connection with servomechanisms to automatically cause appropriate positioning.

For example, a fully automatic system with manual override disclosed for another purpose in the commonly assigned Breitbarth et al. U.S. Pat. No. 3,229,391, may be employed and the details thereof are herein incorporated by reference. In this respect, the Breitbarth et al patent also discloses structure by which the fixed and rotative impedances of the synchrogenerator may be mechanically associated with the universal connection 16.

Turning now to FIG. 6, a modified steering mechanism 20 is illustrated. It is employed with a traction unit 14 identical to that previously described with the exception that the central frame 60 thereof includes a pair of upstanding, apertured ears 120. Disposed between the ears 120 is a yoke 122 which is pivotally connected to the ears 120 by means of pivot pins 124 by which relative rotative movement between the yoke 122 and the traction unit 14 about a first generally horizontal axis may be had. The yoke 122 also includes integral stop elements 126 which may abut the upper surface of the central frame 60 to limit the degree of canting of the same about the axis defined by pivot pins 124.

A second yoke element 128 sandwiches the yoke 122 medially thereof and is pivotally connected thereto by means of pivot pin 130 for relative rotation about a second generally horizontal axis which is transverse to the horizontal axis defined by pins 124. The yoke element 128 also includes an upstanding post 132 which may be suitably journalled by any appropriate bearings to the lower end of one of the leg elements 34. Of course, suitable retaining means will also be provided.

The post 132 permits the traction unit 14 to pivot about a generally vertical axis and, as can be seen from the illustration in FIG. 6, the axes defined by pins 130 and 124 are aligned with the axis of the post 132 such that a universal interconnection is established between one of the leg elements 34 and the traction unit 14.

A T-bar 140 is secured by any suitable means (not shown) to the leg element 34 and includes two pairs of apertured tongues 142 which receive pivot pins 144 by means of which a pair of hydraulic cylinders 146 are pivotally connected to the leg structure. The rods 148 of the cylinders 146 are connected to respective pairs of apertured ears 150 integral with the second yoke 128 by means of pivot pins 152.

As a result of the foregoing, it will be appreciated that selective energization of the cylinders 146 will cause shifting of the second yoke 128 about a generally vertical axis coextensive with the post 132 for steering purposes. In addition, the connections provided by the pins 124 and 130 allow the traction unit 14 to cant as may be required by the underlying terrain without altering the angular relationship of the traction unit 14 to the leg 12 about the vertical axis provided by the post 132.

From the foregoing, it will be appreciated that a vehicle made according to the invention can operate in waters of substantial depth without remote control problems as have been previously encountered. The universal pivotal connection of each traction unit to its associated leg allows each traction unit to substantially freely pivot by gravity to assure a maximum engagement with the underlying terrain to maximize driving effectiveness. Through the use of the telescoping structure in the legs, the vehicle may move while the elevated work platform may be maintained substantially horizontally. It will also be appreciated that the arrangement of the various power sources for the traction units, their steering mechanism, and the telescoping structures of each leg are adapted for independent and conjoint operation as may be required to provide a maximum flexibility in use. It will also be appreciated that power for the submerged elements of the system may be provided from mechanism on the platform itself and conveyed thereto by means of electric cables or hydraulic fluid lines, depending upon the types of operators employed.

It will also be appreciated that each traction unit 14 can be formed very similarly to conventional traction units employed in non-submerged earth-working operations with only minor modifications. Because of this fact, the steering devices for rotating each traction unit about a vertical axis on its associated leg need not take on the form of motor devices interconnecting the leg and the traction unit. Rather, in some instances, it may be preferable to accomplish steering in the same manner presently employed for steering track-type crawler tractors, i.e., by braking one track on a traction unit 14 while continuing to drive the other; and the term "steering devices" herein is intended to encompass the controls normally employed for such alternate braking and driving of two tracks.

From the foregoing, it will be appreciated that the invention provides an ideal vehicle for work in the surf zone, i.e., depths up to about fifty feet wherein excellent control is achieved at such substantial depths.

We claim:

1. A vehicle for surf zone work comprising: a generally horizontal platform adapted to be located above water level and support work equipment; a plurality of at least three legs extending downwardly at spaced locations, from said platform; a plurality of at least three traction units, one for each leg, for engaging and traveling upon submerged terrain; a plurality of means, one for each leg, connecting an associated traction unit to the lower end of a corresponding leg for substantially universal movement thereon; a plurality of steering devices, one for each leg, for selectively rotating the associated traction unit about a generally vertical axis; a plurality of means, one for each leg, for selectively adjusting the effective length of the associated leg; whereby said vehicle may travel over uneven, submerged terrain with said platform maintainable generally horizontal by adjusting the effective length of said legs, the limited universal movement of each traction unit permitting each traction unit to individually adjust to abrupt changes in the underlying terrain over which it individually is travelling; each steering device including a motor connected to one of the associated leg and traction unit; and a linkage including a substantially universal connection interconnecting the motor and the other of the associated leg and traction unit.

2. The vehicle of claim 1 wherein said substantially universal connection includes said connecting means.

3. The vehicle of claim 2 wherein each said motor includes a reciprocal output member and is pivotally secured to the associated leg and each said connecting means includes a first yoke pivotally secured to the associated traction unit for relative movement about a first generally horizontal axis, a second yoke pivotally secured to said first yoke for relative movement about a second generally horizontal axis transverse to said first horizontal axis and to the associated leg for rotation about said generally vertical axis, said reciprocal output member being pivotally secured to said second yoke.

4. The vehicle of claim 1 wherein each said motor is pivotally secured to the associated leg and including a reciprocal output member, each said connecting means including a ball joint, and each said linkage including a first link pivotally connected to the associated leg and associated output member, and a second link universally pivotally interconnecting said output member and said traction unit.

5. The vehicle of claim 1 wherein each said selective adjusting means comprises telescoping structure in the corresponding legs and motor means for selectively telescoping the corresponding telescoping structure.

6. The vehicle of claim 1 further including a plurality of synchro position correspondence control systems, one for each leg and associated traction unit, each including a synchrogenerator associated with the traction unit and leg and a synchromotor responsive thereto for indicating the position of relative rotation about said generally vertical axis of said traction unit on the associated leg.

* * * * *

UNITED STATES PATENT OFFICE
CERTIFICATE OF CORRECTION

PATENT NO. : 3,900,077
DATED : August 19, 1975
INVENTOR(S) : James E. Gee et al

It is certified that error appears in the above—identified patent and that said Letters Patent are hereby corrected as shown below:

On the Title Page, Item [73], change the spelling of the assignee's corporate name from "Caterpillar Tractor Company" to ---Caterpillar Tractor Co.---.

Signed and Sealed this twenty-fifth Day of November 1975

[SEAL]

Attest:

RUTH C. MASON
Attesting Officer

C. MARSHALL DANN
Commissioner of Patents and Trademarks